(12) United States Patent
Minagawa et al.

(10) Patent No.: US 6,819,985 B2
(45) Date of Patent: Nov. 16, 2004

(54) SHIFT CONTROL DEVICE FOR HYBRID VEHICLE

(75) Inventors: Yuusuke Minagawa, Kanagawa (JP); Toshikazu Oshidari, Kanagawa (JP); Keyvan Kargar, Versailles (FR); Yves Pichon, Boulogne-Billancourt (FR)

(73) Assignee: Nissan Motor Co., Ltd., Yokohama (JP)

( * ) Notice: Subject to any disclaimer, the term of this patent is extended or adjusted under 35 U.S.C. 154(b) by 72 days.

(21) Appl. No.: 10/375,347

(22) Filed: Feb. 28, 2003

(65) Prior Publication Data

US 2003/0176955 A1 Sep. 18, 2003

(30) Foreign Application Priority Data

Mar. 13, 2002 (JP) ........................................ 2002-068303

(51) Int. Cl.[7] .............................. H02P 7/00; H02P 3/00; B60K 6/02
(52) U.S. Cl. ........................ 701/22; 180/65.3; 318/139
(58) Field of Search ........................... 701/22; 180/65.3, 180/65.1, 65.6, 65.4; 318/9, 139, 432, 8, 13; 322/7, 16, 40; 290/40 B, 40 C, 40 F (56) References Cited

U.S. PATENT DOCUMENTS

| | | | |
|---|---|---|---|
| 5,931,757 A | 8/1999 | Schmidt | ........................ 475/2 |
| 6,333,612 B1 * | 12/2001 | Suzuki et al. | ................ 318/432 |
| 6,336,063 B1 | 1/2002 | Lennevi | ........................ 701/22 |
| 6,369,531 B1 * | 4/2002 | Oshima et al. | ............. 318/139 |
| 6,381,522 B1 * | 4/2002 | Watanabe et al. | ............. 701/22 |
| 6,383,114 B1 | 5/2002 | Hoshiya et al. | ................. 477/2 |
| 6,470,983 B1 * | 10/2002 | Amano et al. | ............. 180/65.2 |
| 6,546,319 B2 * | 4/2003 | Yamaguchi et al. | .......... 701/22 |
| 6,715,572 B2 * | 4/2004 | Shimabukuro et al. | .... 180/65.6 |

FOREIGN PATENT DOCUMENTS

| | | |
|---|---|---|
| DE | 199 09 424 A1 | 8/2000 |
| EP | 0 828 340 A2 | 3/1998 |
| EP | 8 829 387 A2 | 3/1998 |
| EP | 1 157 873 A2 | 11/2001 |
| JP | 56-145702 A | 11/1981 |
| JP | 9-233607 A | 9/1997 |
| JP | 11-82649 A | 3/1999 |
| JP | 2000-87777 A | 3/2000 |
| JP | 2000-142146 A | 5/2000 |
| JP | 2000-238555 A | 9/2000 |

OTHER PUBLICATIONS

U.S. patent application Ser. No. 10/375,026, Minagawa et al., filed Feb. 28, 2003.
J.S. Souder, "Powertrain Modeling and Nonlinear Fuel Control", Masters of Science in Mechanical Engineering, Controls, University of California, Berkeley, 2002, pp. 1–38.

* cited by examiner

*Primary Examiner*—Thomas C. Black
*Assistant Examiner*—Dalena Tran
(74) *Attorney, Agent, or Firm*—Foley & Lardner LLP (57) ABSTRACT

A shift control device includes a controller and a differential mechanism including four rotating elements. Each of the elements is connected to an engine, two motor/generators and an output. The controller is programmed to calculate a target driving power; make a judgment as to whether the target driving power is less than or equal to a driving power wherein the engine is driven under optimum fuel efficiency; when the judgment shows that the target driving power is larger than the driving power, calculate an engine's speed and torque wherein the target driving power is realized such that the engine is driven for maximum load; and control the engine under the engine's speed and torque.

10 Claims, 8 Drawing Sheets

SHIFT CONTROL DEVICE FOR HYBRID VEHICLE

CROSS-REFERENCE TO RELATED PATENT APPLICATIONS CROSSREF

BACKGROUND OF THE INVENTION

1. Field of the Invention

The present invention relates to a shift control device for a hybrid vehicle having a plurality of power sources such as an engine or a motor mounted thereon, and more particularly, to a shift control device which is enabled to perform a continuously variable transmission by differential mechanisms such as planetary gear mechanisms.

2. Description of the Related Art

A hybrid vehicle using a differential mechanism is disclosed in JP-A-2000-142146.

JP-A-2000-142146 discloses a planetary gear including three elements (sun gear, carrier and ring gear), and if for any two elements the rotating speeds are determined, the rotating speed of the remaining element is determined. This is called three elements and two degrees of freedom. These three elements are connected to an engine, an output to wheels and to two motor/generators.

In this hybrid vehicle, a part of engine power is supplied to one of the motor/generators to generate electric power, and the electric power is supplied to the other of the motor/generators to work as a motor. The motor carries out working as a continuously variable transmission and increases or decreases the output driving power by using the differential mechanism.

However, in the construction of JP-A-2000-142146, one of the motor/generators is connected to a drive axle directly, and there is only a final gear ratio between the motor/generator and wheels. So it is often necessary to use a battery power. Also an area wherein it is possible to drive the motor/generator by only a power that the engine generated is narrow.

Especially while accelerating, a driving torque and an electric power consumption of the motor/generator increases. And if the operating region wherein the motor/generator consumes a battery is increased, it is necessary to provide a large capacity of the battery.

SUMMARY OF THE INVENTION

In the present invention, there is provided a shift control device for a hybrid vehicle having a differential mechanism including at least four rotating elements whose rotating states are determined by two element rotating states. The differential mechanism can amplify an output torque. In this hybrid vehicle, an engine connected to one of the rotating elements may be controlled for optimum fuel efficiency, because of fuel efficiency.

But if the engine is always controlled for optimum fuel efficiency, when high acceleration is required, driving power will be lacking.

The present invention provides a solution to the above mentioned problems of a large capacity of the battery and lacking a driving power.

According to the present invention, there is provided a shift control device for a hybrid vehicle. The shift control device has a differential mechanism including at least four rotating elements whose rotating states are determined by two elements, and each of the elements is connected to a driving source, two motor/generators and an output.

And the shift control device has a controller programmed to calculate a target driving power based on a driving condition; make a first judgment as to whether the target driving power is less than or equal to a first driving power wherein the driving source is driven under optimum fuel efficiency calculated based on a current output rotating speed; when the first judgment shows that the target driving power is larger than the first driving power, calculate a first driving source speed and a first driving source torque wherein the target driving power is realized such that the driving source is driven for maximum load; and control the driving source under the first driving source speed and the first driving source torque.

DETAILED DESCRIPTION OF THE PREFERRED EMBODIMENTS

Figure 1:
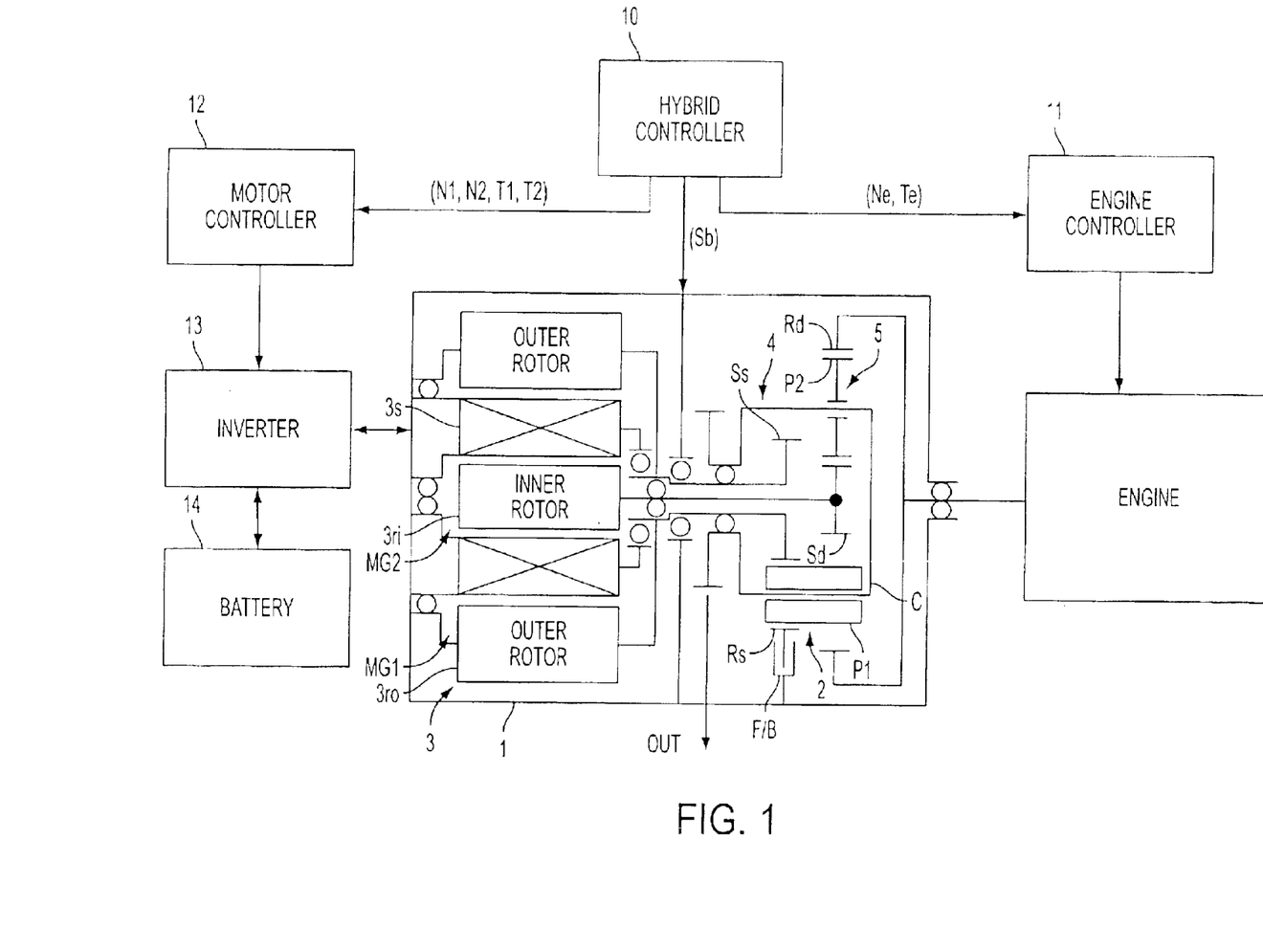
FIG. 1 is a block schematic diagram of a shift control device of a hybrid vehicle.

Referring to FIG. 1 of the drawing, this drawing shows an embodiment of a hybrid vehicle in which the present invention is applied to a power transmission for a front-wheel drive car.

In the construction of the transmission, Ravigneawx planetary gear set 2 (hereafter, Ravigneawx 2) is arranged in an axis direction of an engine (on the engine side) inside of a transmission case 1. A multiple current motor 3 (hereafter, multiple motor 3) is arranged in an axis direction of the engine (opposite to the engine) inside of the transmission case 1.

The Ravigneawx 2 and the multiple motor 3 are arranged coaxial.

The Ravigneawx 2 comprises a single pinion planetary gear set 4 (hereafter, single planetary 4) and a double pinion planetary gear set 5 (hereafter, double planetary 5), which share first plurality of pinions P1. The single planetary 4 is arranged in the multiple motor 3 side, and double planetary 5 is arranged in the engine side.

In the single planetary 4, both a sun gear Ss and a ring gear Rs engage the first pinion P1.

In the double planetary 5, second plurality of pinions P2 engage a sun gear Sd, a ring gear Rd and the first pinions P1, respectively.

A common carrier C supports each of pinions P1 and P2, free to rotate.

The Ravigneawx 2, having the above construction, comprises five rotation members in the form of the sun gear Ss, the sun gear Sd, the ring gear Rs, the ring gear Rd and the carrier C. If the rotating speeds of any two elements are determined, the rotating speeds of the remaining three elements are determined. This arrangement thus has five elements and two degrees of freedom.

The ring gear Rd of the double planetary 5 is connected to a crankshaft of the engine so as to transmit the engine rotation to the ring gear Rd of the double planetary 5.

On the other hand, the carrier C is connected to an output, for example a differential gear, so as to transmit an output of the Ravigneawx 2 to the carrier C and then to the vehicle drive train.

The multiple motor 3 comprises an inner rotor 3ri, an outer rotor 3ro and an annular coil 3s. The outer rotor 3ro surrounds the inner rotor 3ri, and both are arranged coaxial and free to rotate. The annular coil 3s, supported by the transmission case 1, is arranged coaxial between the inner rotor 3ri and the outer rotor 3ro.

A first motor/generator MG1 is composed of the annular coil 3s and the outer rotor 3ro. A second motor/generator MG2 is composed of the annular coil 3s and the inner rotor 3ri.

The first motor/generator MG1 and the second motor/generator MG2 work as a motor/generator, respectively. When multiple current is provided to the first and second motor/generators, they work as motors for individual direction according to the polarity of electric current and at individual speeds according to the amount of electric current.

When multiple current is not provided to the first and second motor/generators, they work as generators according to a force from the output side.

The sun gear Sd of the double planetary 5 is connected to the inner rotor 3ri of the second motor/generator MG2, and the sun gear Ss of the single planetary 4 is connected to the outer rotor 3ro of the first motor/generator MG1.

In this embodiment, a forward brake F/B, provided in the transmission case 1, is able to stop a rotation of the ring gear Rs of the single planetary 4.

The design and operation of the transmission of the hybrid vehicle will be further described with reference to FIG. 2.

As the first plurality of pinions P1, engage the sun gear Ss, and do not engage the sun gear Sd directly, a diameter of the sun gear Ss is larger than a diameter of the sun gear Sd (Ss>Sd).

For a similar reason, a diameter of the ring gear Rd is larger than a diameter of the ring gear Rs (Rd>Rs). In the single planetary 4, the diameter of the ring gear Rs is much larger than the diameter of the sun gear Ss (Rs>>Ss).

Figure 2:
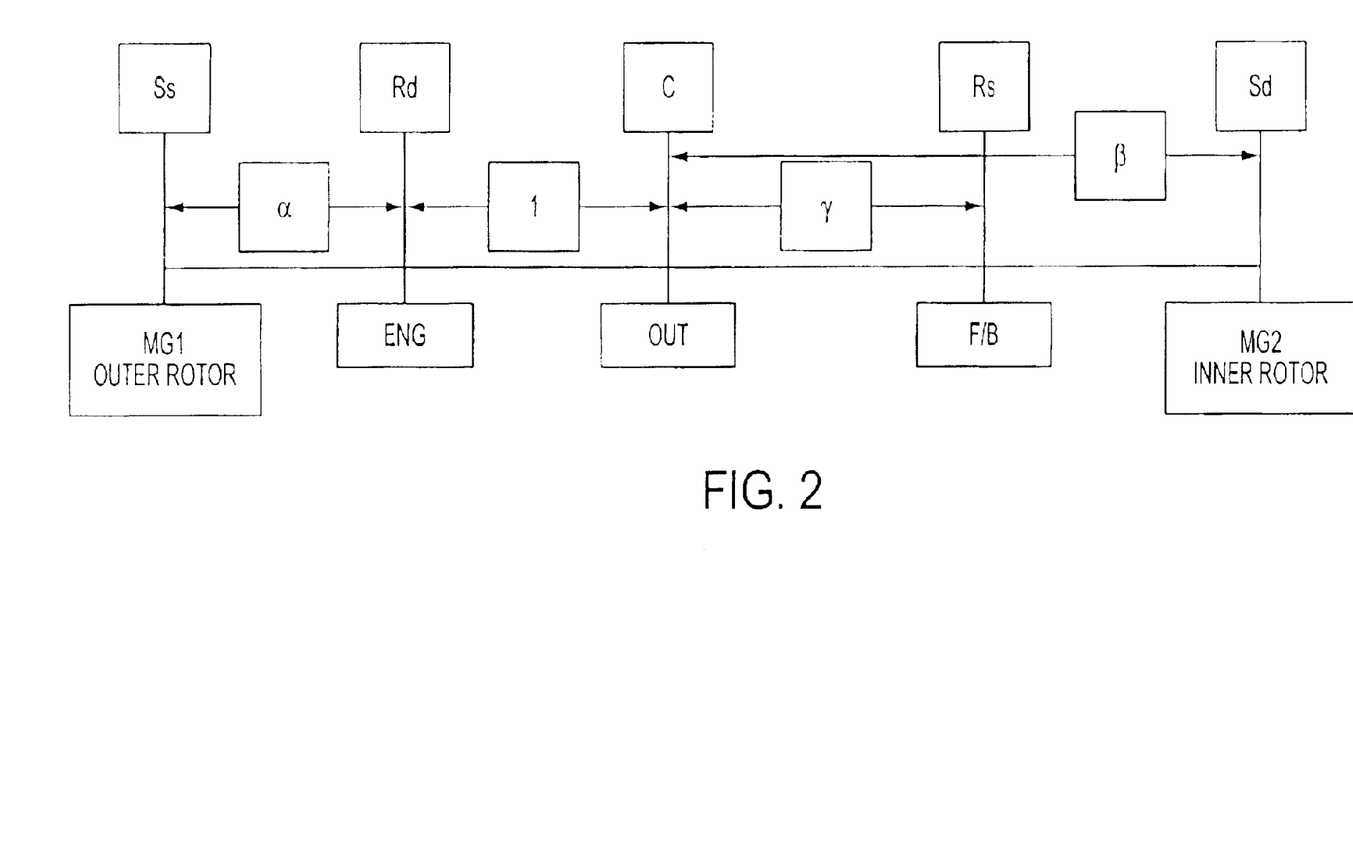
FIG. 2 is a diagram (sometimes called a lever analogy diagram) of a hybrid vehicle with a shift control device.

A distance between the carrier C and the sun gear Sd in FIG. 2 is decided by the number of teeth of the ring gear Rd.

A lever ratio $\alpha$ is a ratio of a distance between the ring gear Rd and the sun gear to a distance between the ring gear Rd and the carrier C (=1).

A lever ratio $\beta$ is a ratio of a distance between the sun gear Sd and the carrier C to a distance between the ring gear Rd and the carrier C(=1).

A lever ratio $\gamma$ is a ratio of a distance between the ring gear Rs and the carrier C to a distance between the ring gear Rd and the carrier C(=1).

As shown in FIG. 2, the value $\beta$(=(the teeth number of Rd)/(the teeth number of Sd)) is largest compared with $\alpha$, $\gamma$, and 1.

As the lever ratio $\beta$ is large, a rotating speed of the second motor/generator MG2 is fast compared to the carrier C. As a result, if a power of output is constant, a necessary torque of the second motor/generator MG2 is restrained.

The forward brake F/B is not necessary for this invention. If the ring gear Rs is omitted, the transmission of the hybrid vehicle is constructed as four elements and two degrees of freedom.

Figure 3:
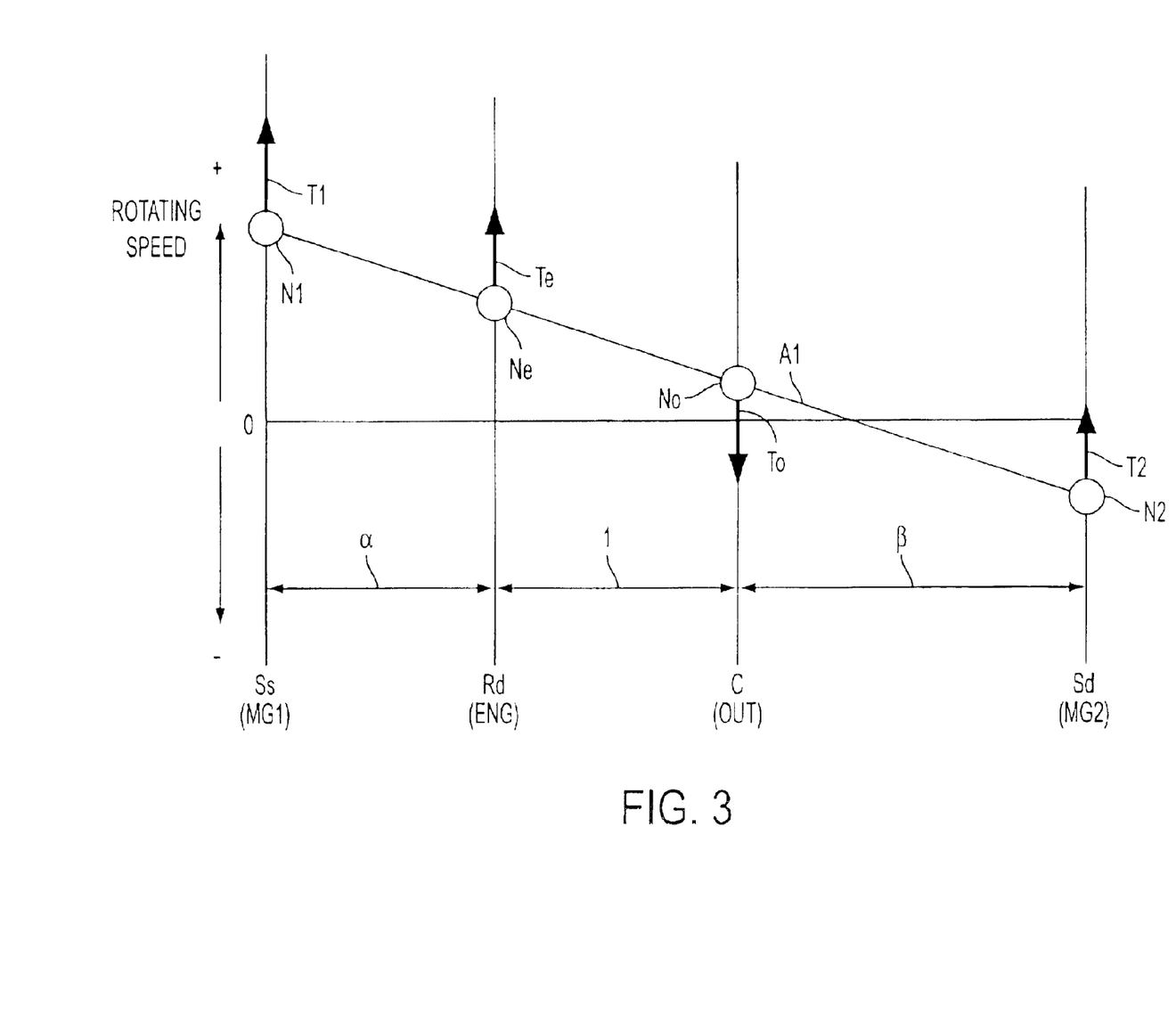
FIG. 3 is a diagram (sometimes called a lever analogy diagram) of a hybrid vehicle with a shift control device without a forward brake.

FIG. 3 shows how the speeds and other parameters of the elements relate to each other.

Now, if the engine, the motor/generator MG1, the motor/generator MG2 and the output have respective rotating speeds of Ne, N1, N2 and No and if the engine, the motor/generator MG1, the motor/generator MG2 and the output have respective torque Te, T1, T2 and To, the following simultaneous equations are satisfied. In this embodiment, a gear efficiency $\eta_m$ is set to 1 for convenience.

The output rotating speed No is determined from a speed change ratio i and the rotating speed of engine Ne, as follows:

$$No=Ne/i$$

The motor/generator rotating speeds N1, N2 are represented by the following equations (1), (2):

$$N1=Ne+\alpha(Ne\text{-}No)\text{---} \quad (1)$$

$$N2=No-\beta(Ne\text{-}No)\text{---} \quad (2)$$

The torque T1, T2, Te and To are balanced as shown in the following equation (3):

$$To=T1+T2+Te\text{---} \quad (3)$$

If an output power of a battery is shown as Pb, the motor's power are balanced as shown in the following equation (4):

$$N1\cdot T1+N2\cdot T2=Pb\text{---} \quad (4)$$

In a rotational equilibrium of moment of lever A1, the following equation (5) is satisfied:

$$\alpha T1+(1+\beta)T2=To\text{---} \quad (5)$$

If one of the motor/generators MG1, MG2 generates all of the electric power that the other of the motor/generators MG1, MG2 consumes, the output power of the battery Pb is equal to 0 (this will be called the "direct-consumption mode").

The torque T1, T2 satisfy the following equations:

$$T1=-[N2/\{\beta\cdot N1+(\alpha+1)\cdot N2\}]\cdot Te$$

$$T2=[N1/\{\beta\cdot N1+(\alpha+1)\cdot N2\}]\cdot Te$$

If power balances between the motors MG1, MG2 and the generators MG2, MG1 are lost, basically the above equations remain about the same.

Figure 4:
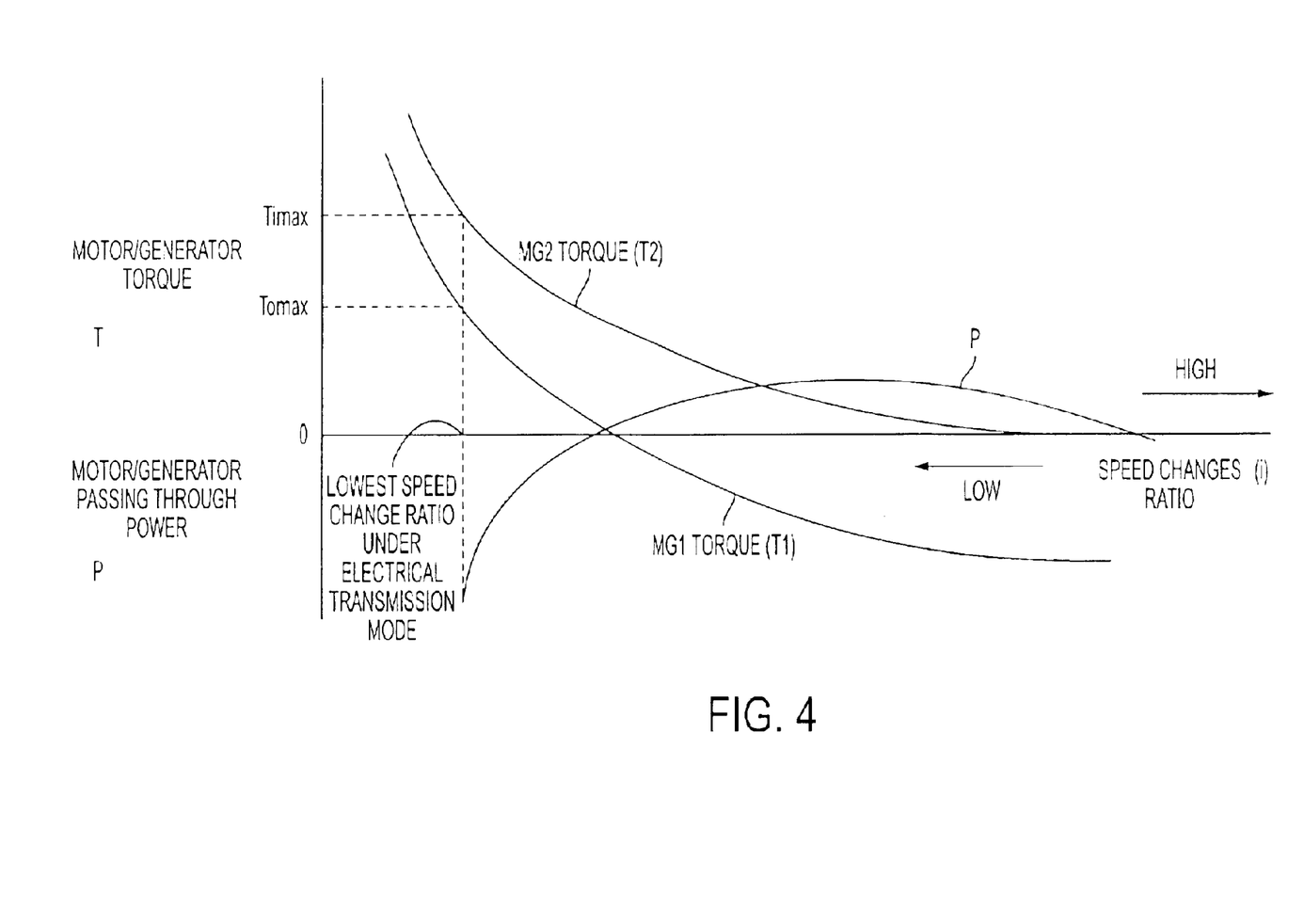
FIG. 4 is a map showing a characteristic of motor torque and motor power against speed change ratio of the hybrid vehicle.

FIG. 4 shows the necessary torque T1, T2, based on FIGS. 2 and 3, and a change characteristic of power P passing through the motor/generators, in relation to the speed change ratio i, under a condition wherein the engine operating point (Ne, Te) is set as (1, 1).

And curves T1, T2, P, as shown in FIG. 4, indicate as ratios to the engine operating point (Ne, Te).

The more the speed change ratio goes to the low side, the more an inclination of the lever of FIG. 3 becomes large and the torque T1, T2 and the power P passing through the motor/generators MG1, MG2 (in absolute value) become large.

The torque T1, T2 and the power P passing through the motor/generators MG1, MG2 have limitations. So the speed change ratio i (shown in FIG. 3 as an inclination of the lever A1), determined by the rotating state of the motor/generators MG1, MG2 (as will be called the "electrical transmission mode"), has the lowest speed change ratio determined by the torque T1, T2.

A movement of the engine operating point (Ne, Te) changes the inclination of the lever A1, shown in FIG. 3. So the lowest speed change ratio under the electrical transmission mode can be changed to a lower ratio by a reduction of the engine torque.

It is important that the engine operating point (Ne, Te) is determined by an optimum fuel efficiency curve, if it is possible to obtain a target driving power in accordance with driving conditions.

If the target driving power is large and it is impossible to realize by an engine control under optimum fuel efficiency, the direct-consumption mode can not be employed. Then an engine speed and an engine torque under a maximum load condition, gained by full throttle, are determined on the basis of a maximum torque curve. The engine speed under a maximum load condition is smaller than the engine speed under the optimum fuel efficiency, but the engine torque under a maximum load condition is larger than the engine torque under the optimum fuel efficiency. The determined engine speed and torque are set as the engine operating point (Ne, Te) so that it is possible to obtain a larger target driving power.

In the hybrid vehicle, shown in FIG. 1, when the forward brake F/B is applied to stop a rotation of the ring gear Rs, the Ravigneawx 2 transmits an engine rotation from the ring gear Rd to the carrier C (as will be called the "forward brake mode"), as shown in the diagram in FIG. 2.

In the forward brake mode, the forward brake F/B works as a fulcrum and the engine (the ring gear Rd) works as an emphasis (or amplifier), so amplified engine torque is output from the carrier. So it is possible to obtain a demanded large torque from only the engine without using the motor/generators MG1, MG2.

In the forward brake mode, the lowest mechanical speed change ratio is lower than the lowest speed change ratio under the electrical transmission mode.

In this embodiment, a hybrid controller 10 controls the transmission of the hybrid vehicle, as shown in FIG. 1.

The hybrid controller 10 sends commands regarding the engine operating point (Ne, Te) to an engine controller 11, and the engine controller 11 works as the engine is driven at the engine operating point (Ne, Te).

The hybrid controller 10 sends commands regarding motor/generator operating points (N1, T1) and (N2, T2) to a motor controller 12, and the motor controller 12 controls the motor/generators MG1, MG2 via an inverter 13 as the motor/generators MG1, MG2 are driven at the motor/generator operating points (N1, T1) and (N2, T2), respectively.

As necessary, the motor/generators MG1, MG2 are supplied electric power from a battery 14 via the inverter 13.

The hybrid controller 10, moreover, sends a command to apply the forward brake F/B as necessary.

Figure 5:
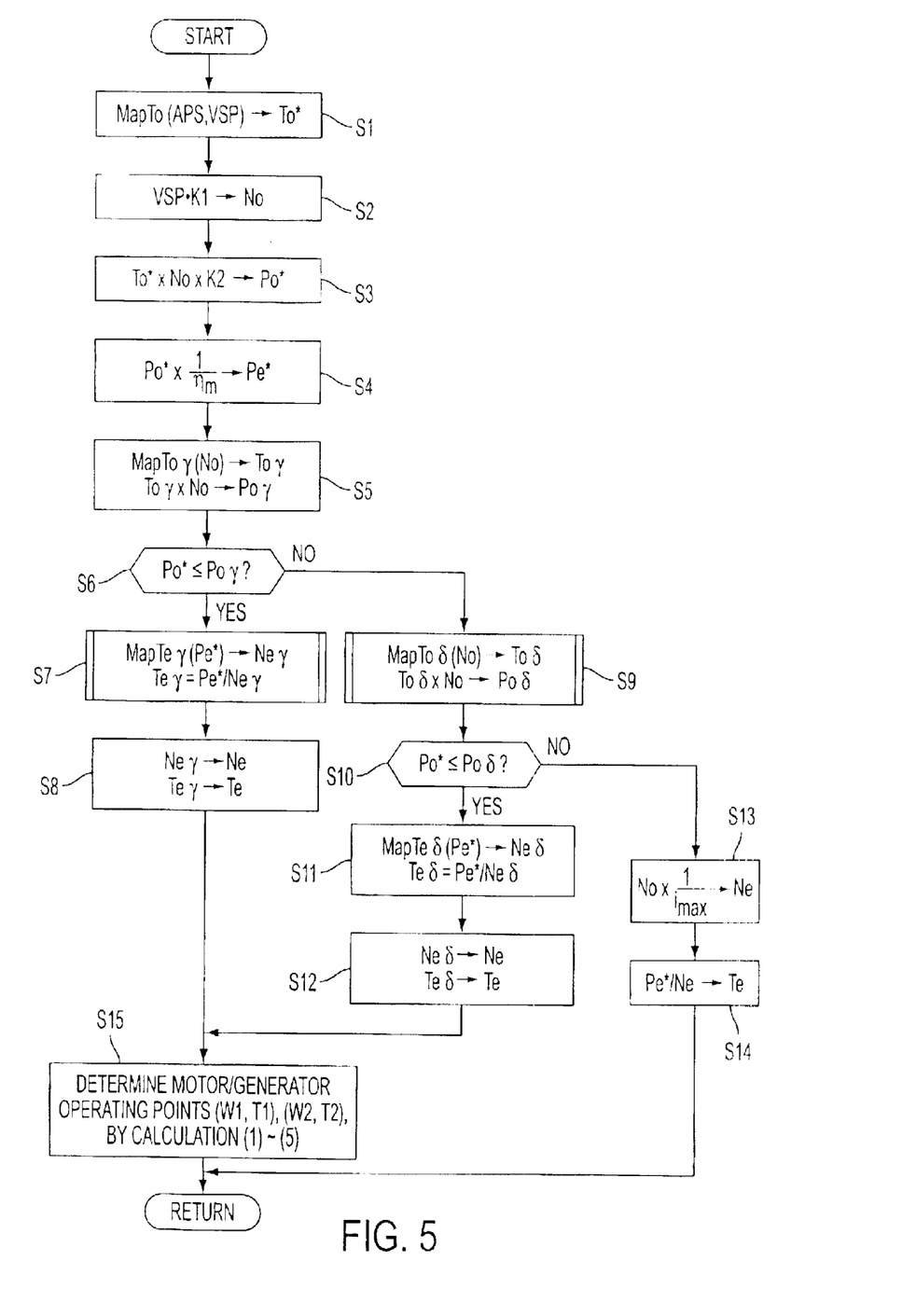
FIG. 5 is a flowchart showing operation of a shift control device of the hybrid vehicle.

The hybrid controller 10 runs a program routine, as shown in FIG. 5, and determines the engine operating point (Ne, Te), the motor/generator operating points (N1, T1) and (N2, T2), respectively, as follows.

The hybrid controller 10 sends commands regarding determined operating points (Ne, Te), (N1, T1) and (N2, T2) to the engine controller 11 and the motor controller 12, respectively.

Figure 6:
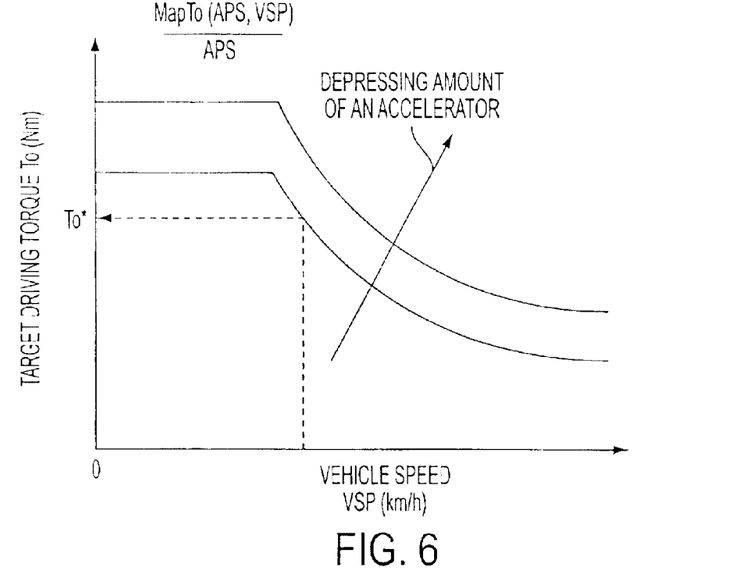
FIG. 6 is a map showing a characteristic of a target driving torque against a vehicle speed at various depressing amounts of an accelerator.

At step 1, a target driving torque To* is calculated based on a depressing amount of an accelerator APS and a vehicle speed VSP on the basis of a map showing the target driving torque To* and the vehicle speed VSP at various depressing amounts of an accelerator APS, as shown in FIG. 6.

At step 2, an axle rotating speed No is calculated based on a multiplication between the vehicle speed VSP and a conversion factor K1.

At step 3, a target driving power Po* is calculated based on a multiplication of the target driving torque To*, the axle rotating speed No and a coefficient K2.

At step 4, a target engine power Pe* is calculated by dividing the target driving power Po* by system efficiency $\eta_m$.

Figure 7:
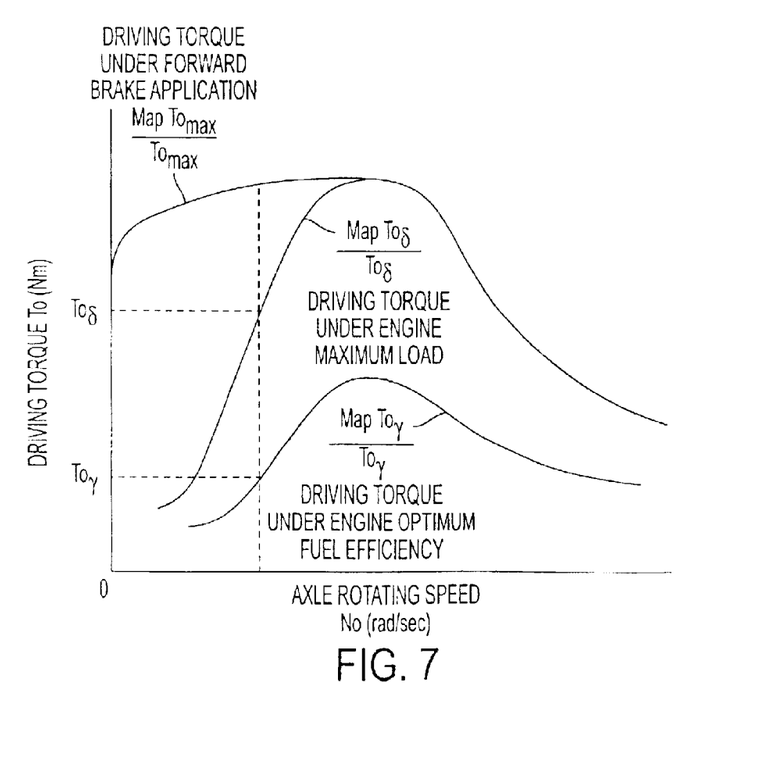
FIG. 7 is a map showing a characteristic of a driving torque against an axle rotating speed when carrying out a control under engine-optimum-fuel-efficiency or a control under the engine-maximum-load or stopping the rotation of a ring gear Rs by the forward brake.

At step 5, a driving torque under optimum-fuel-efficiency-engine-control To $\gamma$ is calculated based on a map showing a relationship between an axle rotating speed No, driving torque To and the driving torque under optimum-fuel-efficiency-engine-control To $\gamma$, as shown in FIG. 7.

The driving torque under optimum-fuel-efficiency-engine-control To $\gamma$ is a torque to realize an optimum fuel efficiency under a current axle rotating speed.

Moreover, a driving power under optimum-fuel-efficiency-engine-control Po $\gamma$ is calculated based on a multiplication of the driving torque under optimum-fuel-efficiency-engine-control To $\gamma$ and the axle rotating speed No.

Figure 8:
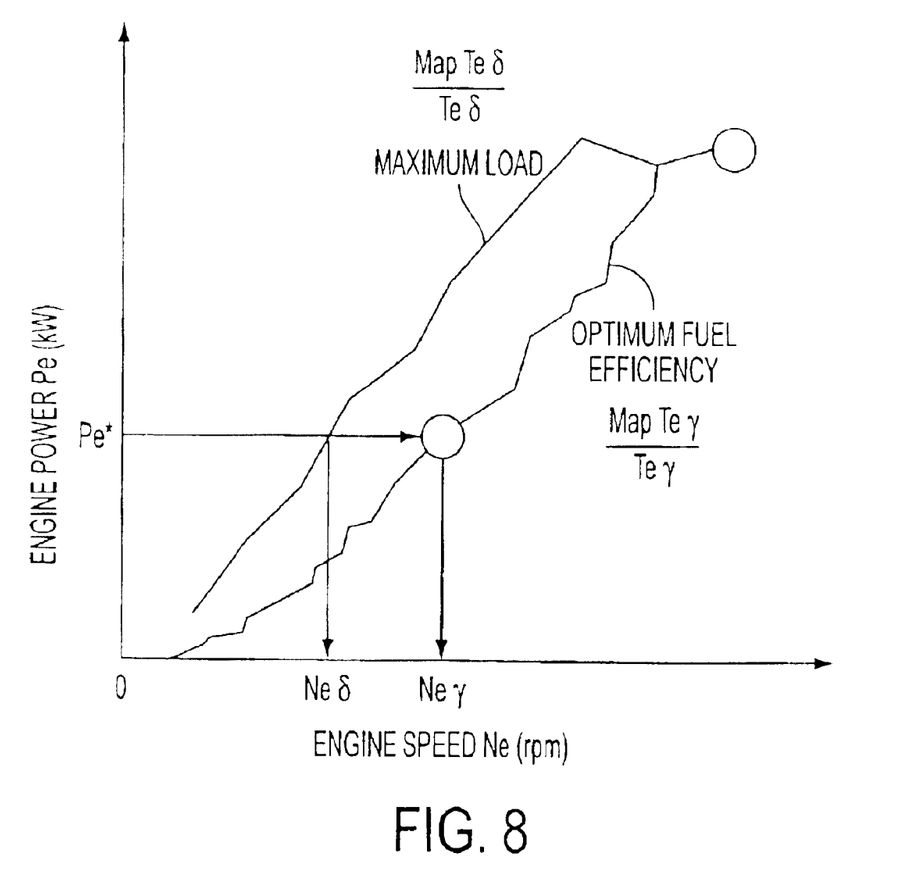
FIG. 8 is a map showing a characteristic of a relationship between engine power and engine speed when a control under engine-optimum-fuel-efficiency or a control under the engine-maximum-load is carried out.

At step 6, a judgment is carried out as to whether the target driving power Po* is less than or equal to the driving power under optimum-fuel-efficiency-engine-control Po $\gamma$. If the judgment result of step 6 is YES, processing flow progresses to step 7, and an engine speed under optimum-fuel-efficiency-engine-control Ne $\gamma$ is calculated based on a map showing a relationship between an engine power Pe, the engine speed Ne and the engine speed under optimum-fuel-efficiency-engine-control Ne $\gamma$, as shown in FIG. 8.

The engine speed under optimum-fuel-efficiency-engine-control Ne $\gamma$ is an engine speed to realize the target engine power Pe* under optimum fuel efficiency.

An engine torque under optimum-fuel-efficiency-engine-control Te $\gamma$ is calculated by dividing the target engine power Pe* by the engine speed under optimum-fuel-efficiency-engine-control Ne $\gamma$.

At step 8, the engine speed under optimum-fuel-efficiency-engine-control Ne $\gamma$ and the engine torque under optimum-fuel-efficiency-engine-control Te $\gamma$ are set as the engine operating point (Ne, Te).

If the judgment result of step 6 is NO, processing flow progresses to step 9, and a driving torque under maximum-load-engine-control To $\delta$ is calculated based on a map showing a relationship between the axle rotating speed No, the driving torque To and the driving torque under maximum-load-engine-control To $\delta$, as shown in FIG. 7.

The driving torque under maximum-load-engine-control To $\delta$ is a torque to realize a maximum load with full throttle under a current axle rotating speed.

A driving power under maximum-load-engine-control Po $\delta$ is calculated based on a multiplication of the driving torque under maximum-load-engine-control To $\delta$ and the axle rotating speed No.

At step 10, a judgment is carried out as to whether the target driving power Po* is less than or equal to the driving torque under maximum-load-engine-control Po δ. If the judgment result of step 10 is YES, processing flow progresses to step 11.

At step 11, an engine speed under maximum-load-engine-control Ne δ is calculated based on a map showing a relationship between the engine power Pe, the engine speed Ne and the engine speed under maximum-load-engine-control Ne δ, as shown in FIG. 8.

The engine speed under maximum-load-engine-control Ne δ is an engine speed to realize the target engine power Pe* under a maximum load with full throttle.

An engine torque under maximum-load-engine-control Te δ is calculated by dividing the target engine power Pe* by the engine speed under maximum-load-engine-control Ne δ.

At step 12, the engine speed under maximum-load-engine-control Ne δ and the engine torque under maximum-load-engine-control Te δ are set as the engine operating point (Ne, Te).

After the engine operating point (Ne, Te) is determined at step 8 or 12, processing flow progresses to step 15, and the motor/generator operating points (N1, T1) and (N2, T2) are determined by calculation of equations (1)–(5) on the basis of the target engine speed Ne and the target engine torque Te under the direct-consumption mode.

If the judgment result of step 10 is NO, processing flow progresses to step 13, and the speed change ratio is set to the lowest mechanical speed change ratio $i_{max}$. An engine speed under the forward brake mode ($i_{max} \cdot$NO) is calculated by multiplication of the axle rotating speed No and the lowest mechanical speed change ratio $i_{max}$. The engine speed under the forward brake mode ($i_{max} \cdot$NO) is set as the target engine speed Ne.

At step 14, an engine torque under the forward brake mode (Pe*/Ne) is calculated by dividing the target engine power Pe* by the target engine speed Ne(=$i_{max} \cdot$No).

The engine torque under the forward brake mode (Pe*/Ne) is an engine torque to realize the target engine power Pe* under the target engine speed Ne(=$i_{max} \cdot$No).

The engine torque under the forward brake mode (Pe*/Ne) is set as the target engine torque Te.

The engine operating point (Ne, Te) is determined by the target engine speed Ne and the target engine torque Te set at step 13 and step 14, respectively.

In the above hybrid vehicle control, in a case where the target driving power Po* in accordance with the driving condition is larger than the driving power under optimum-fuel-efficiency-engine-control Po γ which is obtained when fuel efficiency is realized under current axle rotating speed No, in other words, in a case where it is impossible to realize the target driving power Po* by continuation of a control under engine-optimum-fuel-efficiency, the engine speed under maximum-load-engine-control Ne δ and the engine torque under maximum-load-engine-control Te δ which are demanded when the target driving power Po* is realized are set as the engine operating point (Ne, Te), respectively, and the engine is controlled at the engine operating point (Ne, Te).

In other words, in a case where the engine can not realize the target driving power Po* if the engine optimum fuel control is continued, a control under the maximum-load takes the place of the control under engine-optimum-fuel-efficiency.

So the direct-consumption mode wherein all of electric power consumption of one of the motor/generators MG1, MG2 is generated by the other of the motor/generators MG1, MG2 can be realized, if the target driving power is large. In that case, an electric power consumption of the battery is equal to 0 theoretically, and it is possible to downsize the battery.

Moreover, in a case where the target driving power Po* in accordance with the driving condition is larger than the driving power under optimum-fuel-efficiency-engine-control Po γ, which is obtained when a fuel efficiency is realized under current axle rotating speed No, in other words, in a case where it is impossible to realize the target driving power Po* if the control under engine-optimum-fuel-efficiency is continued, the engine operating point (Ne, Te) is calculated as an engine speed and an engine torque when the target driving power is realized by the engine controlled under maximum load.

As mentioned above, if the target driving power Po* is above what the engine alone can provide under optimum-fuel-efficiency, it is still possible to provide such power such that an electric power consumption of the battery is equal to 0 theoretically, and it is possible to downsize the battery.

In the construction wherein the forward brake F/B is able to stop the rotation of the ring gear Rs, as shown in FIG. 1, when a lower speed change ratio beyond the lowest speed change ratio under the electrical transmission mode is demanded, the forward brake F/B stops the rotation of the ring gear Rs, so that it is possible to realize the lower speed change ratio, and it is possible to output a large torque and realize the target driving power without using motor/generators MG1, MG2, as shown by the $To_{max}$ curve in FIG. 7.

Figure 9:
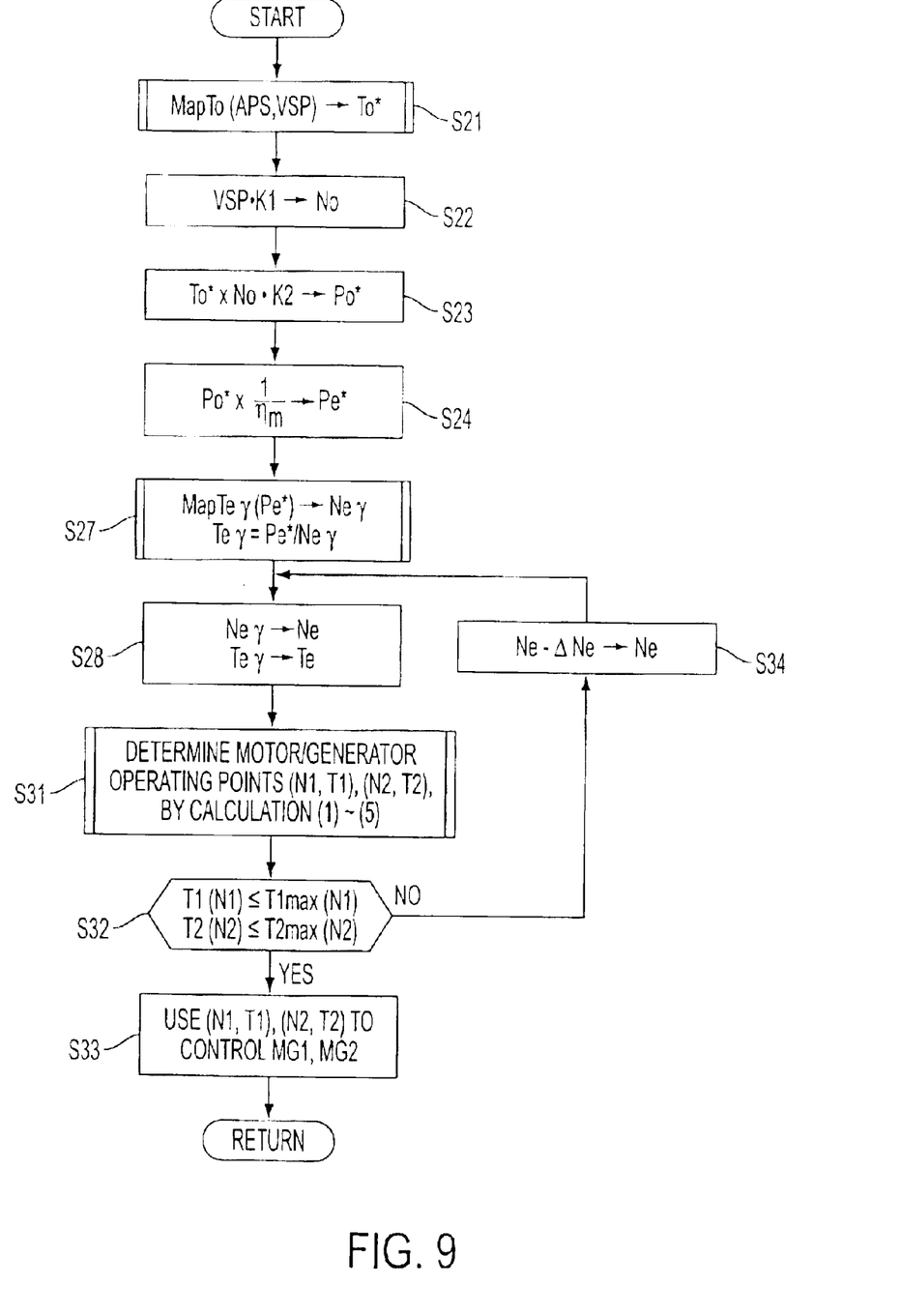
FIG. 9 is a flowchart showing a shift control device of the hybrid vehicle of an other embodiment.

FIG. 9 shows another embodiment of this invention. In this embodiment, step 21–step 24 are similar to step 1–step 4 of FIG. 5, and the target driving torque To*, the axle rotating speed No, the target driving power Po* and the target engine power Pe* are calculated in these steps, respectively.

Step 27 is a similar process to step 7 of FIG. 5, and the engine speed under optimum-fuel-efficiency-engine-control Ne γ and the engine torque under optimum-fuel-efficiency-engine-control Te γ are calculated.

At step 28, the engine speed under optimum-fuel-efficiency-engine-control Ne γ and the engine torque under optimum-fuel-efficiency-engine-control Te γ are set as the engine operating point (Ne, Te).

At step 31, the motor/generator operating points (N1, T1) and (N2, T2) are calculated by calculation of equations (1)–(5) on the basis of the target engine speed Ne and the target engine torque Te, as set at step 28, under the direct-consumption mode.

At step 32, a judgment is carried out as to whether both of the motor/generator torques T1, T2 of the motor/generator operating points are less than or equal to a maximum torque $T1_{max}$, $T2_{max}$. If the judgment result of step 32 is YES, processing flow progresses to step 33, and the motor/generator operating points (N1, T1) and (N2, T2) are used to control the motor/generators MG1, MG2.

But if the judgment result of step 32 is NO, processing flow progresses to step 34, and the target engine speed is reduced by ΔNe from Ne, and at step 31, the motor/generator operating points (N1, T1) and (N2, T2) are calculated based on the reduced Ne. Then the engine torque Te becomes large, but the motor/generator torques T1, T2 and the motor/generator rotating speeds N1, N2 become small.

When both of the motor/generator torques T1, T2 of the motor/generator operating points are equal to or less than a maximum torque $T1_{max}$, $T2_{max}$, the motor/generator operating points (N1, T1) and (N2, T2) are used to control the motor/generators MG1, MG2.

In this embodiment, calculations of the motor/generator operating points (N1, T1) and (N2, T2) are repeated until both of the motor/generator torques T1, T2 of the motor/generator operating points are equal to or less than the maximum torque $T1_{max}$, $T2_{max}$.

In the former embodiment, as shown in FIG. 5, the hybrid vehicle control is switched from the control under optimum-fuel-efficiency to the control under maximum-load, but in this embodiment, the hybrid vehicle control is changed from the control under optimum-fuel-efficiency to the control under maximum-load, gradually.

As an amount of displacement from the control under optimum-fuel-efficiency to the control under maximum-load (an amount of displacement of engine speed) is reduced to a minimum to be able to realize the direct-consumption mode, a deterioration of fuel consumption is reduced to a minimum, and a similar effect of the former embodiment is obtained.

The entire contents of Japanese Patent Application No. 2002-068303, filed Mar. 13, 2002, is incorporated herein by reference.

Although the invention has been described above with reference to embodiments of the invention, the invention is not limited to the embodiments described above. Various modifications and variations of the embodiments described above will occur to those skilled in the art, in light of the above teachings, and are also considered a part of the present invention.

What is claimed is:

1. A shift control device for a hybrid vehicle comprising:
   a differential mechanism including at least four rotating elements whose rotating states are determined by rotating states of two of the at least four rotating elements, wherein the elements connect a driving source, two motor/generators and an output; and
   a controller programmed to:
     calculate a target driving power based on a driving condition;
     make a first judgment as to whether the target driving power is less than or equal to a first driving power corresponding to an operating region wherein the driving source is driven under optimum fuel efficiency;
     when the first judgment shows that the target driving power is larger than the first driving power, calculate a first driving source speed and a first driving source torque corresponding to an operating region wherein the target driving power is realized such that the driving source is driven under maximum load and control the driving source at the first driving source speed and the first driving source torque.

2. A shift control device for a hybrid vehicle as claimed in claim 1, wherein the controller is further programmed to:
   calculate each of motor/generator torque and rotating speed based on the first driving source speed and torque, the current output speed and the target driving power; and
   control motor/generators at calculated torque and rotating speed, respectively.

3. A shift control device for a hybrid vehicle as claimed in claim 1, wherein the first driving power under optimum fuel efficiency is a value when the driving source is driven on an operating point that should be obtained when the driving source is driven under optimum fuel efficiency based on the current output rotating speed.

4. A shift control device for a hybrid vehicle as claimed in claim 1, wherein the driving source is an engine.

5. A shift control device for a hybrid vehicle as claimed in claim 1, wherein the differential mechanism is a Ravigneawx planetary gear set.

6. A shift control device for a hybrid vehicle as claimed in claim 5, wherein the Ravigneawx planetary gear set may be represented as a lever analogy diagram, and the driving source, the two motor/generators and the output are arranged on the lever analogy diagram in the following order:
   a first motor/generator, the driving source, the output, a second motor/generator.

7. A shift control device for a hybrid vehicle as claimed in claim 6, wherein the Ravigneawx planetary gear set includes five rotating elements, and the five elements are connected to the first motor/generator, the driving source, the output, a brake and the second motor/generator, and arranged on the lever analogy diagram in the following order: the first motor/generator, the driving source, the output, the brake and the second motor/generator; and
   the controller is further programmed to:
     make a second judgment as to whether the target driving power is smaller than or equal to a second driving power corresponding to an operating region wherein the driving source is driven under maximum load calculated based on a current output rotating speed;
     when the second judgment shows that the target driving power is larger than the second driving power, the brake stops rotation of a connected rotating element.

8. A shift control device for a hybrid vehicle comprising:
   a differential mechanism including at least four rotating elements whose rotating states are determined by rotating states of two of the at least four rotating elements, wherein elements connect a driving source, two motor/generators and an output; and
   a controller programmed to:
     calculate a target driving power based on a driving condition;
     calculate a second driving source speed and a second driving source torque under optimum fuel efficiency wherein the target driving power is realized;
     calculate a first motor/generator torque and a second motor/generator torque based on the second driving source speed and torque, the current output speed and the target driving power;
     make a third judgment as to whether both the first motor/generator torque is larger than a first motor/generator maximum torque and the second motor/generator torque is larger than a second motor/generator maximum torque;
     when the third judgment shows at least one of the first/second motor/generator torques is larger than the first/second motor/generator maximum torques, decrease the second driving source speed until both of the first/second motor/generator torques are equal to or smaller than the first/second motor/generator maximum torques.

9. A shift control device for a hybrid vehicle as claimed in claim 8, wherein the driving source is an engine.

10. A shift control device for a hybrid vehicle as claimed in claim 8, wherein the differential mechanism is a Ravigneawx planetary gear set.

* * * * *

UNITED STATES PATENT AND TRADEMARK OFFICE
CERTIFICATE OF CORRECTION

PATENT NO. : 6,819,985 B2
APPLICATION NO. : 10/375347
DATED : November 16, 2004
INVENTOR(S) : Yuusuke Minagawa et al.

It is certified that error appears in the above-identified patent and that said Letters Patent is hereby corrected as shown below:

Title Page, item (73) Assignee: should read --NISSAN MOTOR CO., LTD., Yokohama (JP) and RENAULT s.a.s. société par actions simplifiée Boulogne-Billancourt (FR)

Signed and Sealed this

Twenty-fourth Day of February, 2009

JOHN DOLL
*Acting Director of the United States Patent and Trademark Office*